Aug. 4, 1953
L. H. GILLICK ET AL
2,647,452
AIR BLENDING TEMPERATURE CONTROL FOR
HEATING AND COOLING SYSTEMS
Filed Jan. 30, 1948
4 Sheets-Sheet 1
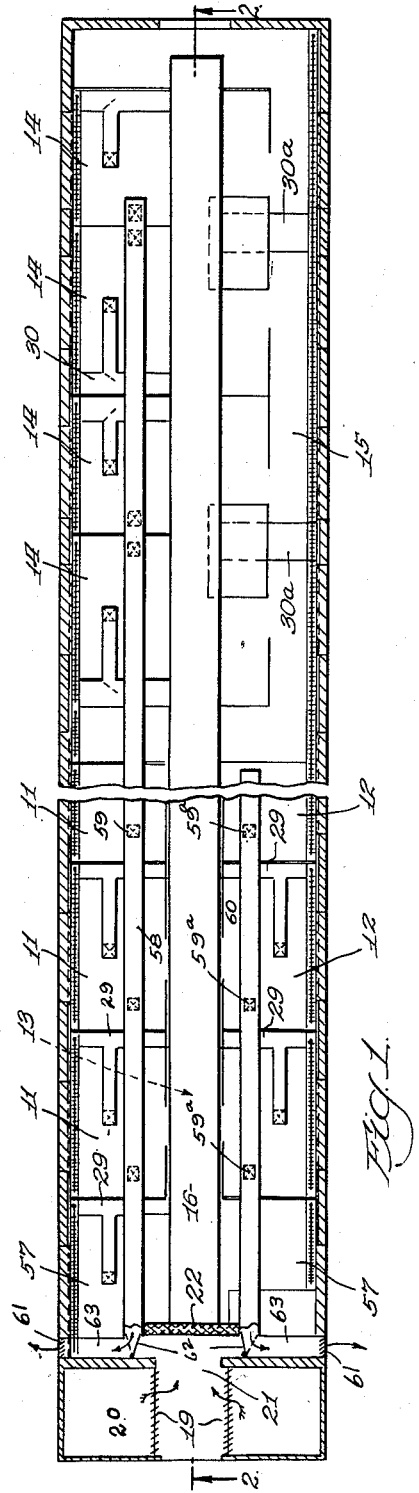
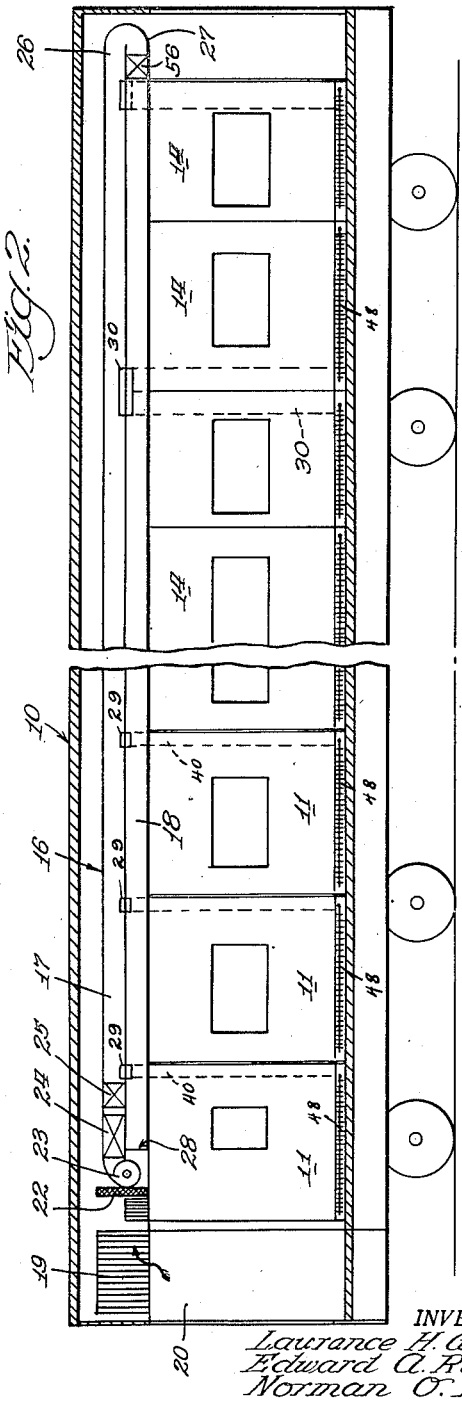
INVENTORS.
Laurance H. Gillick
Edward A. Russell
Norman O. Kirby
BY Harvey M. Gillespie Atty.

Aug. 4, 1953

L. H. GILLICK ET AL 2,647,452

AIR BLENDING TEMPERATURE CONTROL FOR
HEATING AND COOLING SYSTEMS

Filed Jan. 30, 1948

INVENTORS.
Laurance H. Gillick
Edward A. Russell
Norman O. Kirby

BY Harvey M. Gillespie Atty.

INVENTORS.
Laurance H. Gillick
Edward A. Russell
Norman O. Kirby
BY Harvey M. Gillespie Atty.

INVENTORS.
Laurance H. Gillick
Edward A. Russell
Norman O. Kirby
By Harvey M. Gillespie  Atty.

Patented Aug. 4, 1953

2,647,452

UNITED STATES PATENT OFFICE 2,647,452

AIR BLENDING TEMPERATURE CONTROL FOR HEATING AND COOLING SYSTEMS

Laurance H. Gillick, Evanston, Edward A. Russell, Chicago, and Norman O. Kirkby, Elmhurst, Ill., assignors to Vapor Heating Corporation, Chicago, Ill., a corporation of Delaware Application January 30, 1948, Serial No. 5,248

9 Claims. (Cl. 98—10)

This invention relates to improvements in heating and cooling systems in which streams of heated air and/or cooled air are introduced into an enclosed space, for example a railway car, to maintain a desired temperature therein.

A principal object of the invention is to provide improved means for maintaining a desired temperature within an enclosed space by means of streams of air of different temperatures which are blended and introduced into said space.

Another object is to provide, in a temperature controlling system of the above character, improved means whereby the proportions of higher and lower temperature air may be varied, in the blending operation at different locations throughout the enclosed space to compensate for variations in the temperature of the air streams being blended, to vary the temperature at a selected location, for example within a subdivision of the enclosed space, or to compensate for variations in the amount of heat lost or gained at different locations within the enclosed space.

Another object is to provide simplified duct constructions and arrangements for directing the blended and/or non-blended air between the wall structures of the enclosed space so as to heat and/or cool the inner wall panels of the space.

Another object of the invention is to provide a heating and cooling system which is particularly suitable for heating relatively long and narrow enclosures, for example railway passenger cars, and to provide in this connection air heating means at opposite ends of the car adapted to function to supply air at uniform temperatures throughout the full length of the enclosure.

It has been customary heretofore when employing heated and/or cooled air to maintain a desired temperature in a relatively long and narrow enclosure, for example a railway car, to force the air through a single conduit extending the full length of the space, the conduit having discharge openings for delivering air into the space at different locations. Considerable difficulty has been encountered in maintaining uniform temperatures throughout the full length of the space since there is normally a substantial difference in the temperature of the air at the opposite ends of the conduit.

According to the present invention, the main air conduit is composed of two sections which are arranged in close relation to each other and extend the full length of the space. The air, during normal conditions, drawn from the outside of the enclosure is forced by an impeller through an air cooling element and through an air heating element located in the air receiving end of one section of the main duct. The air travels through this section of the duct to the opposite end of the enclosure at which point it enters the other section of the duct and returns to the first mentioned end of the enclosure.

A series of lateral branch ducts communicate with both sections of the main duct at different locations lengthwise of the enclosure. The air received from both sections of the main duct is blended to provide an air stream of the desired temperature in the branch duct. A portion of this blended air is delivered into the interior of the enclosure near the ceiling thereof and another portion is directed into the space between the inner and outer wall panels of the enclosure. Suitable insulation is provided along the inner face of the outer panel so as to conserve the temperature of the air, but the temperature of the air is transferred, in part, to the inner panel of the wall structure. The temperature of the enclosure is therefore altered by the temperature of the air introduced directly into the enclosure and by the temperature imparted to the inner wall panels of the enclosure.

Inasmuch as there is normally a progressive change in the temperature of the air within the main duct in proportion to the length of its travel from the inlet end thereof, the temperature of the air in the primary end return sections of the main duct will be different at different locations lengthwise of the enclosure. In order, therefore, to supply the lateral branch ducts with blended air of a desired temperature, each lateral branch duct is provided with an adjustable valve for proportioning the amount of air delivered into the branch from each section of the main duct.

In addition to the heating and cooling elements previously referred to, the system includes a series of floor radiators which, if desired, may be utilized as heating or cooling elements to alter the temperature of the air between the inner and outer walls of the enclosure. The improved system also includes an auxiliary heating element which is located in the receiving end of the return section of the main duct and is available for use, during severe weather, to heat the air in the return section of the main duct and is available, during the cooling cycle of the system, to raise the temperature of the air in the return section of the main air duct and thereby provide warm air to be blended with the cooled air during mild weather.

According to the principles of the present invention, all air used in the system is drawn from the outside of the enclosure so long as the capacities of the heating and/or cooling apparatus are sufficient to maintain the desired temperature within the enclosure. A vent duct is therefore provided and communicates with the interior of the enclosure at different locations so as to conduct air from the enclosure and discharge it into the outer atmosphere. However, when the weather conditions are such as to impose abnormal heating or cooling loads on the heating and cooling elements of the system, a portion or all of the air from the interior of the enclosure may be recirculated through the temperature altering elements by appropriate adjustment of cooperating valves positioned in the vent ducts.

A further and more specific object of the invention is to provide a temperature control system constructed and functioning substantially as above briefly described.

The invention is illustrated in the accompanying drawings wherein:

Fig. 1 is a diagrammatic view, illustrating in plan, the upper portion of a railway passenger car provided with a heating and cooling system constructed in accordance with this invention.

Fig. 2 is a vertical longitudinal section taken on line 2—2 of Fig. 1.

Figure 3:
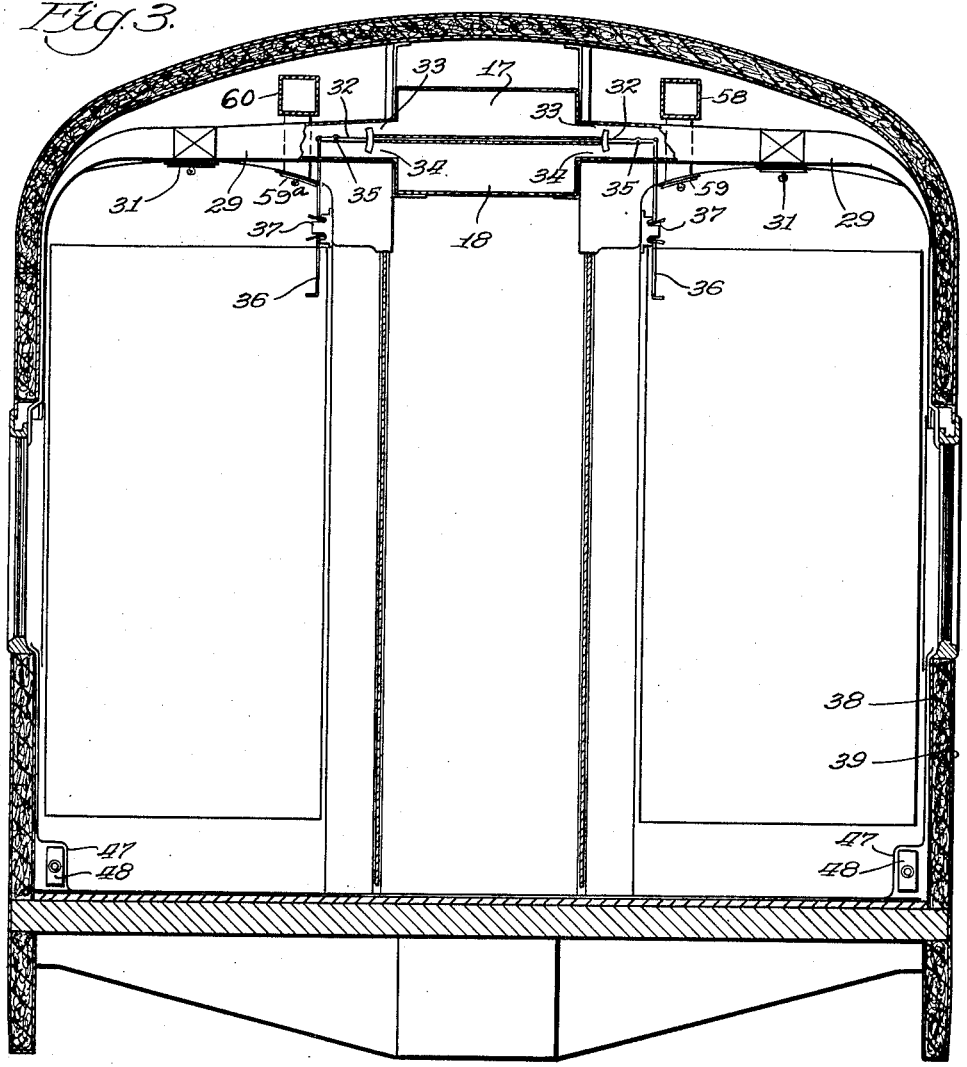
Fig. 3 is a vertical cross sectional view taken through the car to illustrate the arrangement of the main air duct and the lateral branch air ducts communicating with both sections thereof and illustrating also the position of the proportioning valves for controlling the delivery of air from the main duct into the lateral branch ducts.
Figure 4:
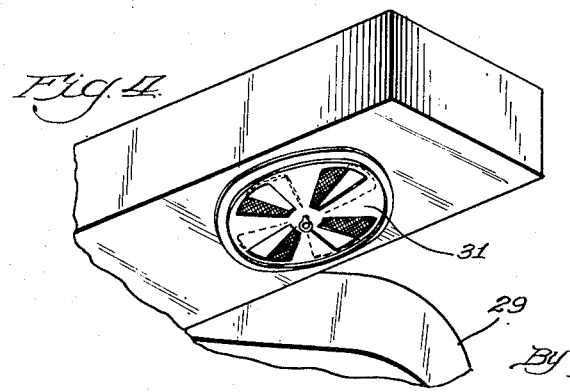
Fig. 4 is a view in perspective of one portion of a lateral branch duct showing an adjustable register therein for delivering air into the interior of the car.
Figure 5:
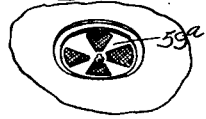
Fig. 5 is a view in perspective of another register for controlling the discharge of air from the interior of the car.

The invention is illustrated in connection with a railway passenger car 10, one end portion of which is provided with a series of separately enclosed spaces 11—12 (roomettes) arranged on opposite sides of a central aisle 13. The other end portion of the car is provided with a series of large rooms 14 which communicate with an aisle 15 extending along one side of the car. A main air duct 16 extends longitudinally of the car along the center thereof for substantially the full length of the car. The said main duct is preferably positioned in the center of the car near the roof thereof and comprises a primary section 17 extending from one end of the car to the other and a return section 18 which extends from the last mentioned end of the car to the first mentioned end. 19—19 designates grills for admitting air from the vestibule space 20 of the car into the air receiving end 21 of the main duct 16. This air is then passed through a filter 22 and is forced by a suitable blower 23 through an air cooler 24 and an air heater 25 located in the air receiving end of the section 17 of the main air duct. The cooling element 24, together with the mechanism for circulating a cooling medium therethrough, may be of any suitable construction, there being several known constructions now in general use. Likewise, the heating element 25 may be of any suitable construction, since the specific constructions of the elements 24 and 25 form no part of the present invention.

The heating and cooling elements may be operated separately or conjointly, depending upon the requirements of the enclosed space. A portion of the air delivered into the inlet end of the primary section 17 of the main duct is discharged, as hereinafter described, into the interior of the the car at spaced locations. Another portion of this air will travel the full length of the car through said section 17 of the main duct and return the full length of the car through the return section 18 of said duct. The discharge end 26 of the primary section 17 of the main duct delivers air into the receiving end 27 of the return section 18 of the duct.

There is normally a substantial difference between the temperature of the air delivered from the heating and cooling elements 24 and 25 into the receiving end of the section 17 of the main duct and the temperature of the air at the terminal end 28 of the return duct. For example, during the normal cooling operation of the system, the air at the terminal end 28 of the return duct 18 will be warmer than the cooled air introduced into the receiving end of the primary duct 17. Likewise, during the normal heating operation of the system, the air at the terminal end 28 of the return section 18 of the main duct will be substantially cooler than the heated air introduced into the section 17 of said main duct. It will be observed, however, that since the change in the air temperatures will be proportional to the linear distance of its travel, air streams of equal temperatures may be introduced into the car at different locations by proportionately blending the air taken from both sections 17 and 18 of the main duct. Accordingly, the air of the present invention is discharged into the interior of the car through a series of lateral branch ducts 29—29 and 30—30a which communicate with both sections 17 and 18 of the main duct. The said lateral branch ducts communicate with opposite sides of the main duct sections 17—18 and conduct the air received therefrom into passages between the inner and outer wall panels of the car. A portion of the air received by the lateral branch ducts is discharged into each of the several rooms 11, 12 and 14 through adjustable grills 31.

A proportioning valve 32 is positioned in each of the branch ducts 29—29 and 30—30a to vary the effective area of the air ports 33—34 through which air is discharged from the sections 17 and 18, respectively, of the main air duct into the branch duct.

During the normal heating and cooling operations, the proportioning valve located near the ends 26 and 27 of the main conduit sections will be positioned so that the branch duct associated therewith will receive approximately equal amounts of air from both sections of the duct. The proportioning valve located nearest the main heating element 25 will be so adjusted that the branch duct associated therewith will receive a smaller amount of the highly cooled or heated air from the upper section 17 than it will receive from the lower section 18 of the main duct. While the above represents the normal adjustment for the proportioning valves so as to provide air streams of equal temperatures for each of the several lateral branch ducts, the said proportioning valves can be adjusted to any position desired by the occupant of the rooms and thereby maintain a room temperature suitable for his individual comfort without affecting any change in temperature of the other rooms. The said proportioning valves 32 may be controlled automatically. However, for the purpose of the present invention the valves 32 are pivotally supported at 35 and are provided with an operating rod 36 which extends into the room associated with the valve whereby the valve can be manually adjusted to any desired position. The adjustment may be maintained by any suitable holder, for example a spring shackle latch 37.

Figure 6:
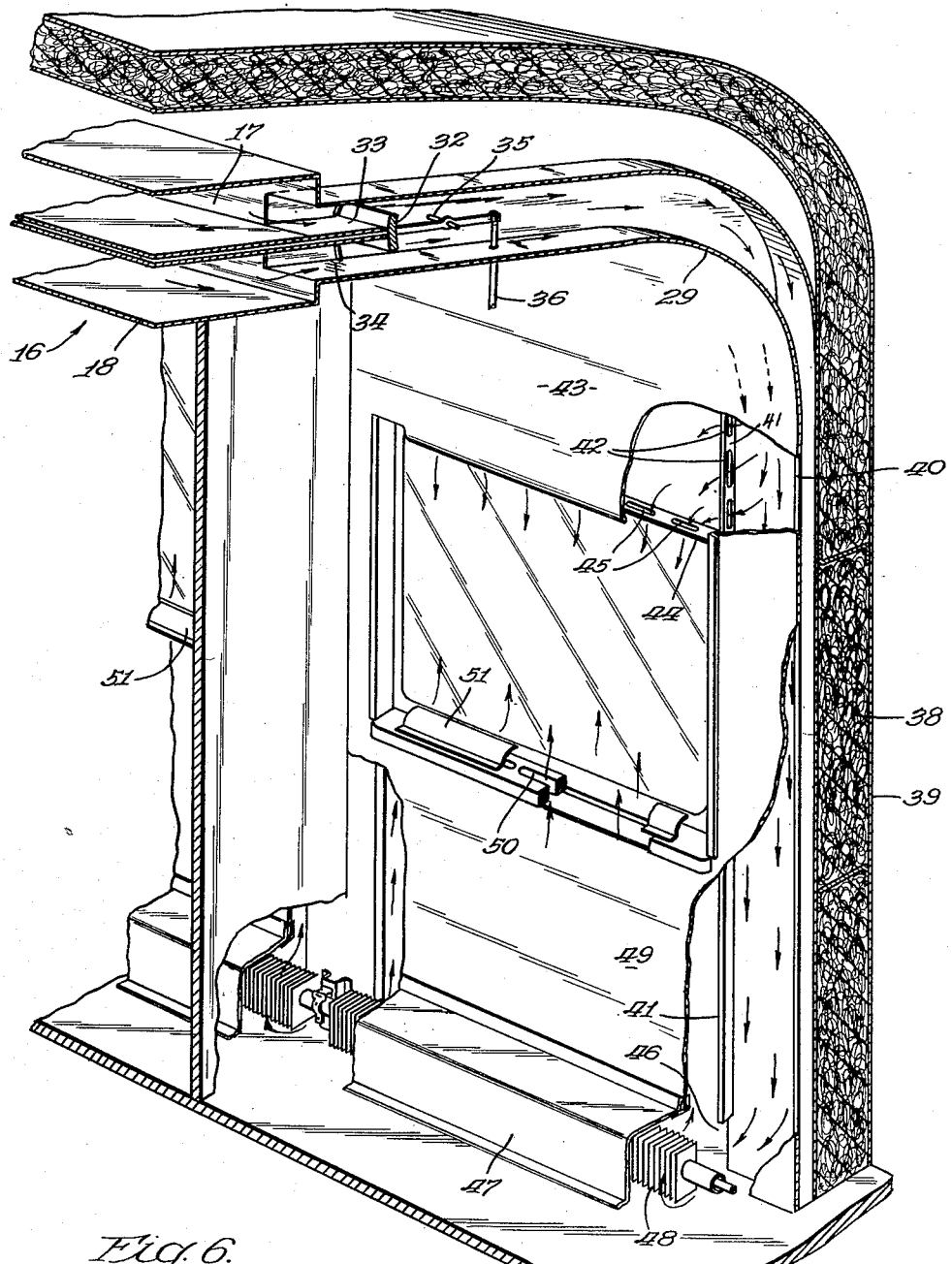
Fig. 6 is a fragmentary perspective view, partly in section, illustrating the position of air ducts between the inner and outer panels of the wall structure and showing the flow paths of the air through the wall passages and into the interior of the car.

A portion of the air in the lateral branch ducts, as previously indicated, is discharged from the manually controlled grills 31 into the several rooms, but the other portion of air is directed into spaces between the inner and outer wall panels of the car so as to heat or cool the inside wall panels. Preferably the inner face of the outer wall panel is covered with suitable insulation 38 to prevent dissipation of the air temperature through the outside panel 39 of the car wall. The said lateral branch ducts preferably lead to vertical passages 40 defined by the vertical reinforcement of the car structure positioned between adjacent windows. The vertical reinforcement 41, as shown in Fig. 6, is provided with a series of openings 42 which permit the air to enter into the space back of the panel 43 located above a window. The upper bar 44 of the window frame is also provided with a series of openings 45 which permit the air to pass downwardly across the glass window pane. Another portion of the air entering the vertical passage 40 between the windows flows downwardly to the floor level of the car. At this location the lower end portion of the car frame member 41 is cut away so as to provide passage 46 to permit the air to move from the passage 40. A housing 47 encloses a floor radiator 48, whereby the air passes over these radiators and into the space back of the inside wall panel 49 located beneath a window so as to heat or cool this panel. The air is then discharged upwardly through openings 50 in the window sill so that it will pass upwardly across the glass window pane. A deflector 51 is preferably positioned over the openings in the window sill so as to direct the air against the window pane. The floor radiators 48, as previously indicated, may be supplied with heating or cooling medium as conditions may require to heat or cool the air entering the space back of the said panel 49.

Figure 7:
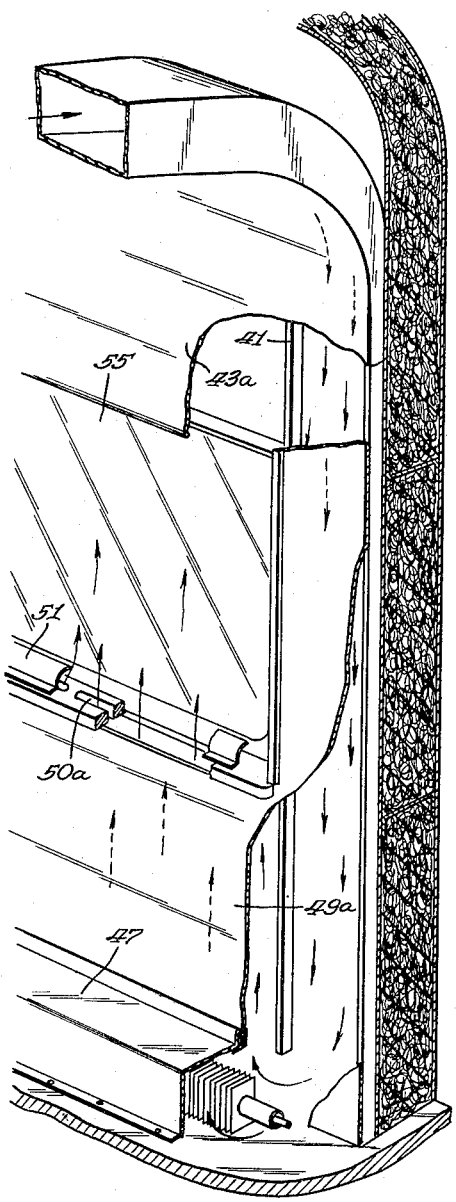
Fig. 7 is a fragmentary perspective view partially in section, illustrating a slight modification of the structure shown in Fig. 6.

Fig. 7 shows a construction similar to that illustrated in Fig. 6 for directing the air back of the inside wall panel, but is modified so as to omit the openings 42 in the vertical member 41 and thereby prevent the air from entering back of the panel above the window, the panel being designated in Fig. 7 by the reference numeral 43a. The air in the modified construction is directed back of the lower panel designated 49a and through openings 50a in the window sill in substantially the same manner as disclosed in Fig. 6.

Figure 8:
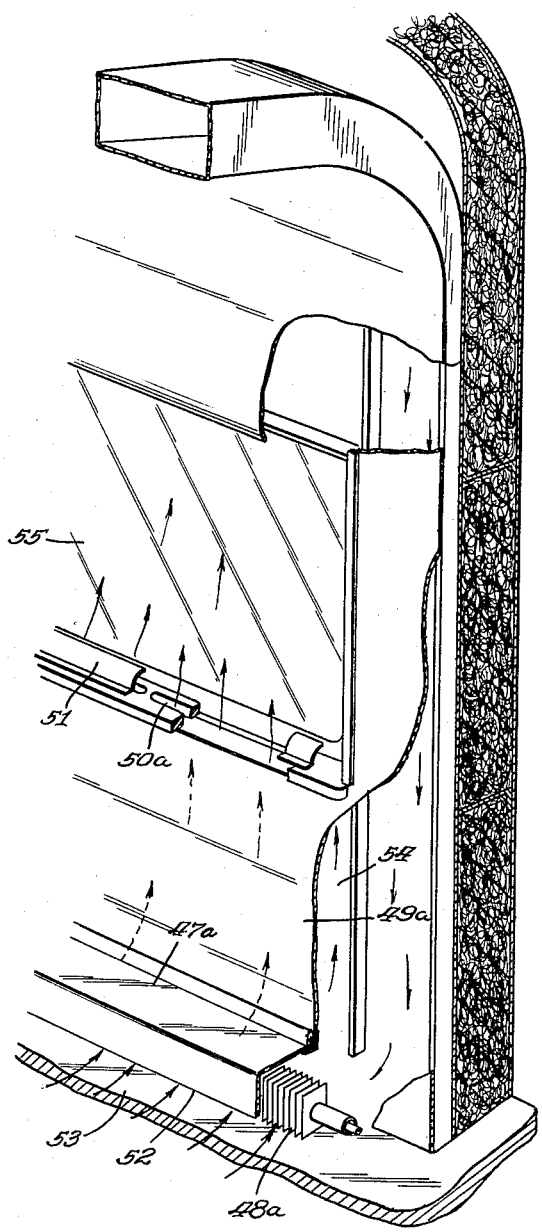
Fig. 8 is a similar view, but showing a further modification whereby air may pass from the interior of the car around the floor radiators and into passages back of a wall panel.

Fig. 8 illustrates another modification which corresponds substantially to the structure shown in Fig. 7 except that the lower edge 52 of the floor radiator housing 47a is spaced a short distance from the floor 53 so that air from the interior of the room may flow by convection across the radiator designated 48a and into the space 54 back of the panel 49a. The window sill of this modification is provided with said openings 50a to permit the air to discharge upwardly across the window pane 55 substantially as described in connection with the constructions shown in Figs. 6 and 7.

In order to moderate the effect of the cooled air during mild weather and also to increase the heating effect, if such is required during extremely cold weather, an auxiliary heater 56 is positioned in the entrance end 27 of the return section 18 of the main air duct. During the cooling cycle of the system in mild weather the auxiliary heater 56 is employed to warm the air in the return section 18 of the main air duct so that this warmed air will be blended with the air delivered from the cooling mechanism 24. The said auxiliary heater 56 may also be available for increasing the temperature of the air in said return section 18 of the main duct during extremely cold weather so as to supplement the air heating function of the heater 25 and insure the introduction of high temperature air into the lateral branch ducts at opposite ends of the car. The aisles 13 and 15 are adequately heated by discharge of heat into the open spaces designated 57—57 at one end of the car and the heat discharged from the ducts designated 30a leading into the side aisle 15.

A vent duct 58 communicates with outlet registers 59 in each of the enclosed spaces 11 and 14 and a similar vent duct 60 communicates with outlet registers 59a located in the enclosed spaces 12 at the other side of the aisle. The air from each of the said spaces is, therefore, normally vented to the outside atmosphere through open grills 61—61. Valves 62—62 are positioned in the outlet ducts 63—63 so as to insure said discharge to the atmosphere. However, during abnormal outside weather conditions when it may be desirable to recirculate the air through the heating and/or the cooling elements 24—25, the said valves 62—62 are turned to the dotted line position shown in Fig. 1 so as to close the passages 63—63 and thereby direct the air from the vent ducts 58 and 60 into the inlet end of the main air duct 16.

We claim:

1. The combination with a railway car having hollow side wall structures defined by inner and outer panels, a series of windows in each side wall structure and vertical passages between adjacent windows; of means for blending air of different temperatures and delivering it into the said vertical passages between the windows comprising a main air conduit including a primary section extending longitudinally of the car, means for forcing air, at a desired temperature, into one end of said primary section, a return duct section communicating with the other end of said primary section and extending lengthwise of the car, means defining pairs of air discharge ports, composed, in each case, of a port in each section of the main conduit, separate branch ducts for conducting air discharged from said pairs of discharge ports into said vertical passages in the walls of the car to alter the temperature of the inner panel thereof, means defining air outlet ports for discharging the air from said vertical passages, and a separate proportioning valve for each pair of discharge ports adapted to be adjustably positioned to vary the effective areas of its associated discharge ports.

2. The combination with a railway car having hollow side wall structures defined by inner and outer panels, a series of windows in each side wall structure and vertical passages between adjacent windows; of means for blending air of different temperatures and delivering it into the said vertical passages between the windows comprising a centrally disposed main air conduit including a primary section extending longitudinally of the car near the roof thereof, means for forcing air, at a desired temperature, into one end of said primary section, a return duct section communicating with the other end of said primary section and extending lengthwise of the car in close relation to the primary section, means defining pairs of air discharge ports, composed, in each case, of a port in each section of the main conduit, separate branch ducts for conducting air discharged from said pairs of discharge ports into the upper ends of said vertical passages in the walls of the car to alter the temperature of the inner panel thereof, means defining air outlet ports for discharging air from said vertical passages, and a separate proportioning valve for each pair of discharge ports adapted to be adjustably positioned to vary the effective areas of its associated discharge ports.

3. The combination with a railway car having hollow side wall structures defined by inner and outer panels, a series of windows in each side wall structure and hollow vertical passages between adjacent windows; of means for blending air of different temperatures and delivering it into the said vertical passages between the windows comprising a centrally disposed main air duct including a primary section extending longitudinally of the car near the roof thereof, means for forcing air, at a desired temperature, into one end of said primary section, a return duct section communicating with the other end of said primary section and extending lengthwise of the car in close relation to the primary section, means defining pairs of air discharge ports, composed, in each case, of a port in each section of the main conduit, separate branch ducts for conducting air discharged from said pairs of discharge ports into the upper ends of said vertical passages in the walls of the car to alter the temperature of the inner panel thereof, means defining air spaces between the walls of the car at locations adjacent the windows and communicating with said vertical passages, and means defining air outlet openings for discharging air from said air spaces into the interior of the car.

4. The combination with a railway car having hollow side wall structures defined by inner and outer panels, a series of windows in each side wall structure and hollow vertical passages between adjacent windows; of means for blending air of different temperatures and delivering it into the said vertical passages between the windows comprising a centrally disposed main air duct including a primary section extending longitudinally of the car near the roof thereof, means for forcing air, at a desired temperature, into one end of said primary section, a return duct section communicating with the other end of said primary section and extending lengthwise of the car in close relation to the primary section, means defining pairs of air discharge ports, composed, in each case, of a port in each section of the main conduit, separate branch ducts for conducting air discharged from said pairs of discharge ports into the upper ends of said vertical passages in the walls of the car to alter the temperature of the inner panel thereof, means defining air spaces between the walls of the car at locations adjacent the windows and communicating with said vertical passages, a temperature altering means positioned near the floor level of the car in certain of said air spaces for altering the temperature of the air passing from said vertical passages into said air spaces, and means defining air outlet openings for discharging air from said air passages into the interior of the car.

5. The combination with a railway car having hollow side wall structures defined by inner and outer panels, a series of windows in each side wall structure, and hollow vertical passages between adjacent windows; of means for blending air of different temperatures and delivering it into the said vertical passages between said windows comprising a centrally disposed main air conduit including a primary section extending longitudinally of the car near the roof thereof, means for forcing air, at a desired temperature, into one end of said primary section, a return duct section communicating with the other end of said primary section and extending lengthwise of the car in close relation to the primary section, means defining pairs of air discharge ports, composed, in each case, of a port in each section of the main conduit, separate branch ducts for conducting air discharged from said pairs of discharge ports into the upper ends of said vertical passages in the walls of the car to alter the temperature of the inner panel thereof, means defining air spaces between the walls of the car at locations beneath the windows and communicating with said vertical passages, a radiator located in said air spaces for heating the air delivered into said spaces, and means defining outlet openings extending through the window frame structure for discharging air from said air spaces across the window panes and into the interior of the car.

6. The combination with a railway car having hollow side wall structures defined by inner and outer panels, a series of windows in each side wall structure and hollow vertical passages between adjacent windows; of means for blending air of different temperatures and delivering it into the said vertical passages between the windows comprising a centrally disposed main air duct including a primary section extending longitudinally of the car near the roof thereof, means for forcing air, at a desired temperature, into one end of said primary section, a return duct section communicating with the other end of said primary section and extending lengthwise of the car in close relation to the primary section, means defining pairs of air discharge ports, composed, in each case, of a port in each section of the main conduit, separate branch ducts for conducting air discharged from said pairs of discharge ports into the upper ends of said vertical passages in the walls of the car to alter the temperature of the inner panel thereof, means defining air spaces between the walls of the car at locations adjacent above and below the windows and communicating with said vertical passages, and means defining air discharge openings through the upper and lower frame members of the windows for discharging air from said spaces across the window panes and into the interior of the car.

7. The combination with a railway car having hollow side wall structures defined by inner and outer panels, a series of windows in each side wall structure and hollow vertical passages between adjacent windows; of means for blending air of different temperatures and delivering it into the said vertical passages between the windows comprising a centrally disposed main air duct including a primary section extending longitudinally of the car near the roof thereof, means for forcing air, at a desired temperature, into one end of said primary section, a return duct section communicating with the other end of said primary section and extending lengthwise of the car in close relation to the primary section, means defining pairs of air discharge ports, composed, in each case, of a port in each section of the main conduit, separate branch ducts for conducting air discharged from said pairs of discharge ports into the upper ends of said vertical passages in the walls of the car to alter the temperature of the inner panel thereof, means defining air spaces between the walls of the car at locations beneath the windows which communicate with said vertical passages and have discharge outlets leading into the interior of the car, heating elements arranged in the car along the floor level thereof, housings for said radiators communicating with said air spaces and having their lower edges spaced from the floor to permit air to pass from the interior of the car across said radiators and into the spaces beneath said windows.

8. The combination with a railway car having hollow side wall structures defined by inner and outer panels, a series of windows in each side wall structure, and vertical passages between adjacent windows and having its interior sub-divided into a plurality of individual rooms; of means for blending air of different temperatures and delivering it into each of said rooms and into the said vertical passages between the windows comprising a main air conduit including a primary section extending longitudinally of the car, means for forcing air, at a desired temperature into one end of said primary section, a return duct section communicating with the other end of said primary section and extending lengthwise of the car, means defining pairs of air discharge ports, composed, in each case, of a port in each section of the main conduit, separate branch ducts for conducting air discharged from said pairs of discharge ports into the said rooms and into the upper ends of said vertical passages, means defining air outlet ports establishing communication of the said branch ducts and vertical passages with said rooms, a separate proportioning valve for each pair of discharge ports adapted to be adjustably positioned to vary the effective areas of its associated discharge ports, vent duct passages communicating with said rooms and having outlet openings to the atmosphere and to the air receiving end of said primary duct section, and valve means for controlling said vent duct outlets to selectively discharge all of the air vented from said rooms to the atmosphere or to direct a portion of said vented air into the air receiving end of the primary section of the main air conduit, as may be desired.

9. An apparatus for blending air of different temperatures and delivering it into an enclosed space comprising a pair of conduit sections traversing the enclosed space in close relation to each other, means for circulating air under pressure through both of said conduit sections, a heating element in the air receiving end of one conduit section for heating the air introduced therein to a desired temperature, means at the other end of this conduit section for delivering air therefrom into the air receiving end of the second conduit section, whereby the said air is conducted, with progressively decreasing temperatures, throughout both of said conduit sections, means defining a plurality of pairs of discharge ports composed, in each case, of a port in each conduit section for discharging air therefrom, a separate branch duct for providing an exclusive connection for each pair of discharge ports adapted to receive air of different temperatures from the ports forming said pair and deliver the blended air into said enclosed space, a proportioning valve for each pair of discharge ports positioned to overlie portions of both ports of such pair, and means for adjustably positioning said valve to vary the effective areas of said associated ports so as to vary the temperature of the blended air delivered into the enclosed space.

LAURANCE H. GILLICK.
EDWARD A. RUSSELL.
NORMAN O. KIRKBY.

References Cited in the file of this patent

UNITED STATES PATENTS

| Number | Name | Date |
|---|---|---|
| 67,894 | Marshall | Aug. 20, 1867 |
| 986,731 | McGerry | Mar. 14, 1911 |
| 1,853,459 | Russell et al. | Apr. 12, 1932 |
| 2,154,801 | Anderson et al. | Apr. 18, 1939 |
| 2,199,341 | Henney | Apr. 30, 1940 |
| 2,204,114 | Anderson | June 11, 1940 |
| 2,351,772 | Lodge | June 20, 1944 |
| 2,424,828 | Keep | July 29, 1947 |

FOREIGN PATENTS

| Number | Country | Date |
|---|---|---|
| 60,857 | Sweden | Nov. 15, 1923 |